United States Patent [19]

Harvey

[11] Patent Number: 4,774,597
[45] Date of Patent: Sep. 27, 1988

[54] QUADRATURE HEAD DUAL CHANNEL VCR

[75] Inventor: Donald M. Harvey, Webster, N.Y.

[73] Assignee: Eastman Kodak Company, Rochester, N.Y.

[21] Appl. No.: 890,213

[22] Filed: Jul. 28, 1986

[51] Int. Cl.⁴ .............................................. H04N 5/92
[52] U.S. Cl. ...................... 360/9.1; 360/23; 360/11.1; 360/36.1; 360/33.1; 358/335; 358/337
[58] Field of Search ............... 360/22, 23, 11.1, 18, 360/36.1, 21, 84, 33.1, 64, 9.1; 358/335, 337

[56] References Cited

U.S. PATENT DOCUMENTS

| | | | |
|---|---|---|---|
| 3,493,677 | 2/1970 | Paine | 360/9.1 |
| 3,686,434 | 8/1972 | Lemelson | 360/18 |
| 3,686,436 | 8/1972 | Comros | 360/33.1 |
| 3,811,008 | 5/1974 | Lee | 358/335 |
| 3,991,266 | 11/1976 | Baer | 358/133 |
| 3,996,672 | 12/1976 | Osofsky | 434/43 |
| 4,001,499 | 1/1977 | Dowell | 358/93 |
| 4,015,080 | 3/1977 | Moore-Searod | 358/109 |
| 4,027,333 | 5/1977 | Kaiser | 358/146 |
| 4,139,868 | 2/1979 | Eisenberg | 360/33.1 |
| 4,139,871 | 2/1979 | Yoshida | 360/64 |
| 4,485,395 | 11/1984 | Warren | 360/26 |
| 4,669,002 | 5/1987 | Nishioka | 360/64 |
| 4,672,467 | 6/1987 | Heitmann | 360/19.1 |

Primary Examiner—Alan Faber
Attorney, Agent, or Firm—Robert M. Wallace

[57] ABSTRACT

Two pairs of opposing magnetic heads mounted in quadrature on a rotary drum simultaneously receive two independent video channels, one channel being quadrature-delayed with respect to the other. The heads simultaneously record the two video channels in adjacent tracks on a video tape moving at twice the normal linear tape speed. To playback one of the two simultaneously recorded video channels, the two pairs of heads retrace their respective recorded tracks while the video tape moves at twice normal linear speed, but only one opposing head pair is connected to playback circuitry. In an alternative embodiment, the tape moves at standard speed while the heads skip-field record the two quadrature-delayed video channels.

13 Claims, 4 Drawing Sheets

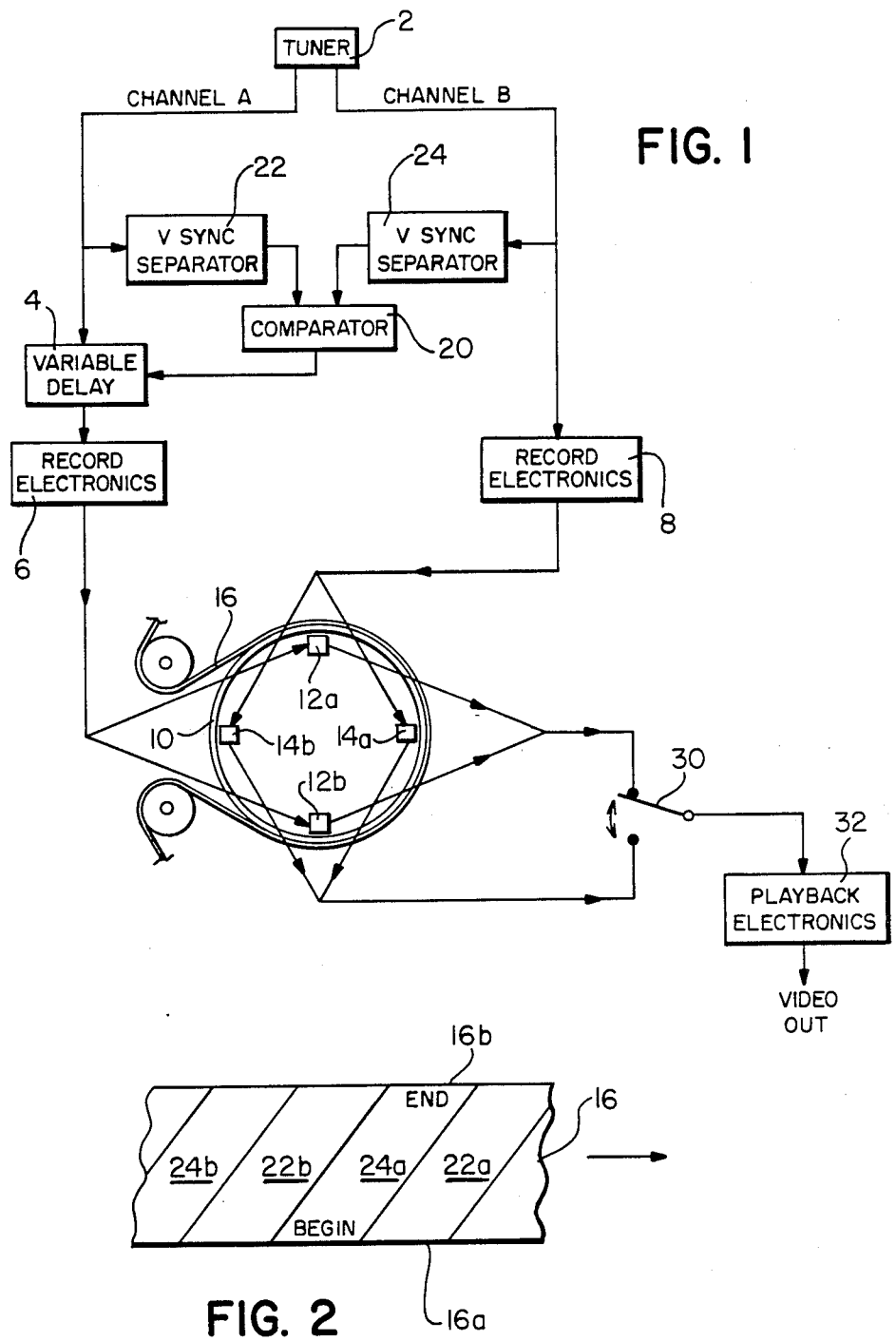

QUADRATURE HEAD DUAL CHANNEL VCR

BACKGROUND OF THE INVENTION

1. Technical Field

The invention relates to consumer video cassette recorders (VCR's). Typically, a VCR includes a tuner capable of selecting one television channel for recording. When two television channels must be recorded simultaneously, two VCR's may be employed.

2. Description of Related Art

There are a number of well-known techniques for dual channel simultaneous video recording. The most obvious method is to employ straight-forward multiplexing of two video signals into a single channel prior to recording, as exemplified in U.S. Pat. No. 3,811,008, U.S. Pat. No. 3,686,434 and U.S. Pat. No. 3,996,672. Another technique is to skip-field record each of two video channels simultaneously, interleaving the fields of the two channels, as disclosed in U.S. Pat. No. 4,139,868, U.S. Pat. No. 4,027,333 and U.S. Pat. No. 3,991,266. Other techniques for handling a plurality of video signals include mixing, as disclosed in U.S. Pat. No. 4,015,080 and U.S. Pat. No. 4,001,499. Video scan conversion is disclosed in U.S. Pat. No. 3,493,677.

Problem

In summary, the prior art teaches the addition of circuitry for multiplexing, mixing or field-skipping whenever more than one video signal must be recorded at any one time. The disadvantage is that such techniques reduce playback image quality and the additional circuitry represents additional cost and complexity. The problem is a need for a video cassette recorder capable of simultaneous dual channel recording without requiring additional multiplexing circuitry or the like. Such a video cassette recorder must be capable of simultaneously recording two video channels annd playing back either one of the two recorded channels selectively.

SUMMARY OF THE INVENTION

Solution to the First Problem

In this invention, simultaneous recording of two independent video channels on the same video tape is accomplished . . . without multiplexing, mixing or skipping fields . . . by a system including a rotary drum having four record/playback heads arranged on the drum periphery in quadrature. The system feeds the first video channel to two of the four heads which are offset by a 180° angle along the drum periphery. The system transports the video tape around the drum so that the two heads record the first video channel in the well-known manner of helical-scan recording. Simultaneously, the second video channel is fed to the remaining two heads. The remaining two heads are also offset from one another by an angle of 180° and are respectively offset from the other pair of heads by an angle of 90°. The remaining two heads record tracks on the tape between the tracks recorded by the first two heads. In order that the recorded track width be the same as that achieved in normal video recording of a single video channel, the video tape is transported at twice the normal linear speed.

Timing

One challenge encountered in the invention is that the recording of each field of each of the two channels must start at the beginning of each track (adjacent one longitudinal edge of the tape) in order for each recorded field to fit length-wise within the track. Therefore, the first video channel must be delayed or advanced with respect to the second video channel by the period of time required for the rotary drum to rotate through the 90° angle separating adjacent heads. This period of time is equal to one-half of the video field scan period. Thus, if the two independent video channels happen to be precisely in synchronization with one another, a delay of one-half of the video field scan period must be imposed on the second video channel so that the beginning of each field of each of the two channels coincides with the beginning of its respective tape track.

Another challenge encountered in this invention is that two independent video channels will not necessarily be in synchronization with one another. In fact, the delay between them may wander in time.

These challenges are met in the invention by a variable delay device including a field store memory which delays one channel with respect to the other during recording. A comparator controls the variable delay device while comparing the vertical sync pulses of the two video channels to be recorded. The comparator senses the amount of delay required to maintain a one-half field delay between the two video channels, and it adjusts the variable delay accordingly on a continuing basis.

During playback, the motion of the tape and of the rotary drum is identical to that required during recording. Thus, each of the four heads retraces the tracks it previously recorded. In order to select one or the other of the two simultaneously recorded video signals, only one of the two pairs of opposing heads are connected to playback circuitry. During playback, the playback electronics may be easily switched between the two recorded video channels.

The advantage of the invention is that the two independent video channels may be simultaneously recorded on the same tape and then played back separately without either multiplexing or skipping fields. The invention is easily adapted to both single channel and dual channel video recording. In single channel recording, the video tape is advanced at normal linear speed while only one of the two pairs of opposing heads is used.

The invention includes the general concept of simultaneously recording a number, n, of video channels with an equal number n of head pairs symmetrically arranged on the rotary drum and separated by uniform angles $$\frac{180°}{n}.$$

DESCRIPTION OF THE DRAWINGS

The invention may be understood by reference to the accompanying drawings, of which:

FIG. 1 is a simplified block diagram illustrating the record and playback system of the invention;

FIG. 2 is a simplified diagram of the video tracks recorded by the system of FIG. 1;

DETAILED DESCRIPTION

Overall System Concept

Figure 3:
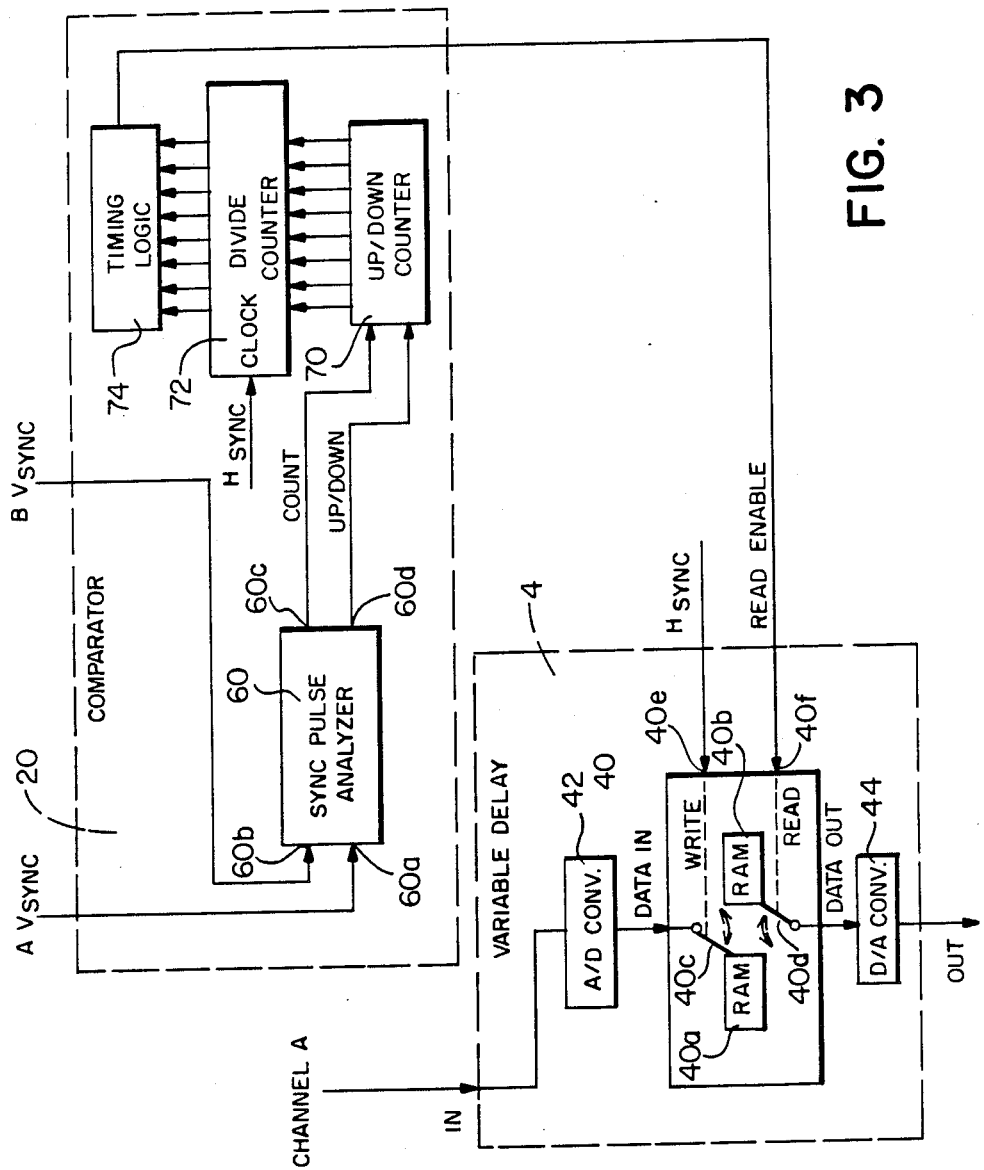
FIG. 3 is a simplified logic diagram illustrating the comparator and the variable delay device of the system of FIG. 1.

Referring to FIG. 1, a television tuner 2 simultaneously receives two different video channels, channel A and channel B, which may be received from different sources, such as two different commercial television stations, for example. The tuner 2 processes the two video signals in the well known manner. The channel A video signal is fed to the input of a variable delay 4 and thence to record electronics 6. The channel B video signal is fed to record electronics 8.

The system further includes recording apparatus comprising a rotary drum 10 and four magnetic heads 12a, 12b, 14a and 14b mounted in quadrature on the periphery of the drum 10. A video tape 16 is wrapped around at least 180° of the circumference of the drum 10 for helical scan recording in the well-known manner. The heads 12a and 12b are offset by 180° from one another, as are the heads 14a and 14b, these two pairs being offset by 90°.

The record electronics 6 feeds the channel A video signal to the head pair 12a, 12b while the record electronics 8 feeds the channel B video signal to the second head pair 14a, 14b.

If just one of the two video channels is to be recorded, for example channel B, the head pair 12a, 12b is inactive while the record electronics 8 feeds the channel B video signal to the head pair 14a, 14b. The drum 10 is rotated at normal speed and the tape 16 is transported for helical scan recording in accordance with well-known techniques.

Simultaneous Dual Channel Recording

If both channel A and channel B are to be recorded simultaneously, then the head pair 12a, b receives the channel A video signal while the head pair 14a, b receives the channel B video signal.

During recording, the video tape 16 is transported at twice the normal speed. Moving the tape at twice the normal speed assures that the recording track width obtained in dual channel recording by the four quadrature heads 12, 14 is the same as that obtained in single channel recording by a single pair of heads (14).

The tracks recorded on the video tape 16 by the four record heads are illustrated in FIG. 2. The first video field of channel A is recorded by the head 12a in track 22a of the video tape 16 during a first one-half revolution of the drum 10. Mid-way through this first half revolution, namely after one-quarter revolution of the drum 10, the head 14a begins recording the first video field of channel B at the beginning of track 24a. One-quarter revolution later, the head 12a has reached the end of track 22a while the head 12b begins recording the second video field of channel A at the beginning of track 22b. One-quarter revolution after this latter event, the head 14a has reached the end of track 24a and the opposing head 14b begins recording the second field of channel B at the beginning of track 24b.

Variable Delay

In accordance with the foregoing description, there must be a delay, corresponding to a quarter rotation by the drum 10, between the beginning of the first field of video channel A on track 22a and the beginning of the first field of channel B on track 24a. In order to fit an entire video field on each track, it is necessary to start each field near the beginning of each track near one edge 16a of the tape 16. Therefore, one of the two video channels must be delayed with respect to the other by an interval corrsponding to a quarter rotation of the drum 10 (which is equivalent to one-half of a video field scan period). Otherwise every other field will be recorded beginning at some point mid-way along the length of the corresponding track (between the tape edges 16a, 16b), and will therefore be cut-off at the end of the track. In standard video NTSC format, the preferable delay is approximately 1/120 second. By delaying channel A with respect to channel B by one-half of a video field scan period, each of the record heads 12a, 12b and 14a, 14b receives the beginning of its respective video field just as it begins recording the respective track near the tape edge 16a.

For this purpose, the variable delay 4 is interposed between the channel A output of the tuner 2 and the input to the record electronics 6. The variable delay 4 delays the video signal of channel A by one-half of one video field scan period with respect to the channel B video signal. The motion of the heads 12, 14 is synchronized with the channel B video signal (in this example).

It is anticipated that channel A and channel B are transmitted to the tuner 2 by two independent commercial television stations whose in-house timing clocks are not synchronized with one another. Thus, contemporaneous video fields of channel A and channel B may be either precisely in sync or offset by as much as one-half a video field or any delay interval therebetween. Moreover, during passage of time, this delay may vary, making it difficult to insure that a precise one-half field delay is maintained between channel A and channel B at the recording heads.

In order to solve this problem, a comparator 20 shown in FIG. 1 controls the amount of delay imposed by the variable delay 4 on the channel A video signal. The comparator 20 receives vertical sync pulses from channel A and channel B through vertical sync pulse separators 22, 24, respectively. If channel A and channel B just happen to be in precise synchronism, that is, if their vertical sync pulses occur simultaneously, the comparator 20 forces the variable delay 4 to interpose a delay equal to one-half of a video field scan period on the channel A video signal. Thus, the channel A video signal is delayed by one-half of a video field scan period before being fed to the record heads 12a, b.

If the relative timing of the video signals in channel A and channel B happens to vary, the comparator 20 will sense this and immediately change the amount of delay imposed by the variable delay 4 on the channel A video signal accordingly, so as to maintain a precise one-half video field delay between the channel A and channel B video signals as furnished to the recording heads 12a, b and 14a, b. For example, if the channel A video signal were to slightly advance in time with respect to the channel B video signal, the comparator 20 would sense this immediately and cause the variable delay 4 to proportionally increase the amount of delay imposed on the channel A video signal.

The result is that each of the heads 12a, b and 14a, b records a video field onto a track 22a, 22b and 24a, 24b, respectively, beginning near the edge 16a of the video tape 16, regardless of timing variations between the channel A and channel B incoming video signals.

Playback

Following simultaneous recording of the video signals of channel A and channel B, either one of the recorded channels may be individually selected for playback. For this purpose, a playback switch 30 selectively connects playback electronics 32 to one or the other of the two pairs of opposing heads, 12a, b or 14a, b. Thus, if it is desired to playback the recorded video signal of channel A, the switch 30 is moved to the position illustrated in FIG. 1, so that the playback electronics are connected to the heads 12a, and 12b and not to the heads 14a, 14b. The rotary motion of the drum 10 and the linear motion of the tape 16 are the same during both playback and recording operations. Thus, each of the heads, 12a, b and 14a, b retraces those tracks which it previously recorded, so that head 12a retraces track 22a, the head 12b retraces track 22b, the head 14a retraces track 24a and the head 14b retraces track 24b. However, in this example only the playback signals picked up by the heads 12a and 12b are applied through the switch 30 to the playback electronics 32 in order to playback the recorded video signal of channel A. In order to playback the recorded video signal of channel B, the position of switch 30 is reversed. Of course, separate video monitors may receive the output at the two head pairs 12, 14 simultaneously for simultaneous viewing of the two recorded signals, or a single monitor can play back both signals simultaneously in a "split field" display.

Exemplary Logic Design

FIG. 3 illustrates an exemplary embodiment of the comparator 20 and the variable delay 4. The variable delay 4 includes a field store memory 40, comprising at least two random access memory (RAM) integrated circuits (or "chips") 40a, 40b, an analog-to-digital converter 42 and a digital-to-analog converter 44 (which are each connected to a different one of the two RAM chips, the two RAM chips being interchanged at the end of each video field by switches 40c, 40d). The channel A video signal is applied to the input of the analog-to-digital converter 42. The output of the analog-to-digital converter 42 is connected to the input of the field store memory 40. The output of the field store memory 40 is applied to the input of the digital-to-analog converter 44 whose output in turn is applied to the record electronics 6. Writing (loading) of data from the analog-to-digital converter 42 into the field store memory 40 is controlled by a write control input 40e of the field store memory 40. The horizontal sync pulse of the channel A video signal is applied to the write control input 40e so that the writing of data from the analog-to-digital converter 42 into the field store memory 40 occurs in synchronism with the channel A video signal horizontal line rate.

Readout of data from the field store memory 40 to the digital-to-analog converter 44 is under control of a read control input 40f of the memory 40. The comparator 20 generates a read enable signal applied to the memory read control input 40f. The comparator 20 senses the time delay between the channel A vertical sync pulse and the channel B vertical sync pulse and accordingly advances or delays the time of commencement of readout (unloading) of each horizontal line of video data stored in the memory 40 by advancing or delaying the read enable signal.

The comparator 20 includes a sync pulse analyzer 60, a synchronous up/down counter 70, a synchronous divide counter 72 and timing logic 74.

The sync pulse analyzer 60 receives the A and B channel vertical sync pulses at its inputs 60a, 60b, respectively. If the A channel sync pulse is either late or early with respect to the desired delay after the B channel sync pulse, the analyzer 60 generates a count pulse at its count output 60c and either a high (late) or low (early) up/down pulse at its up/down output 60d.

Figure 4:
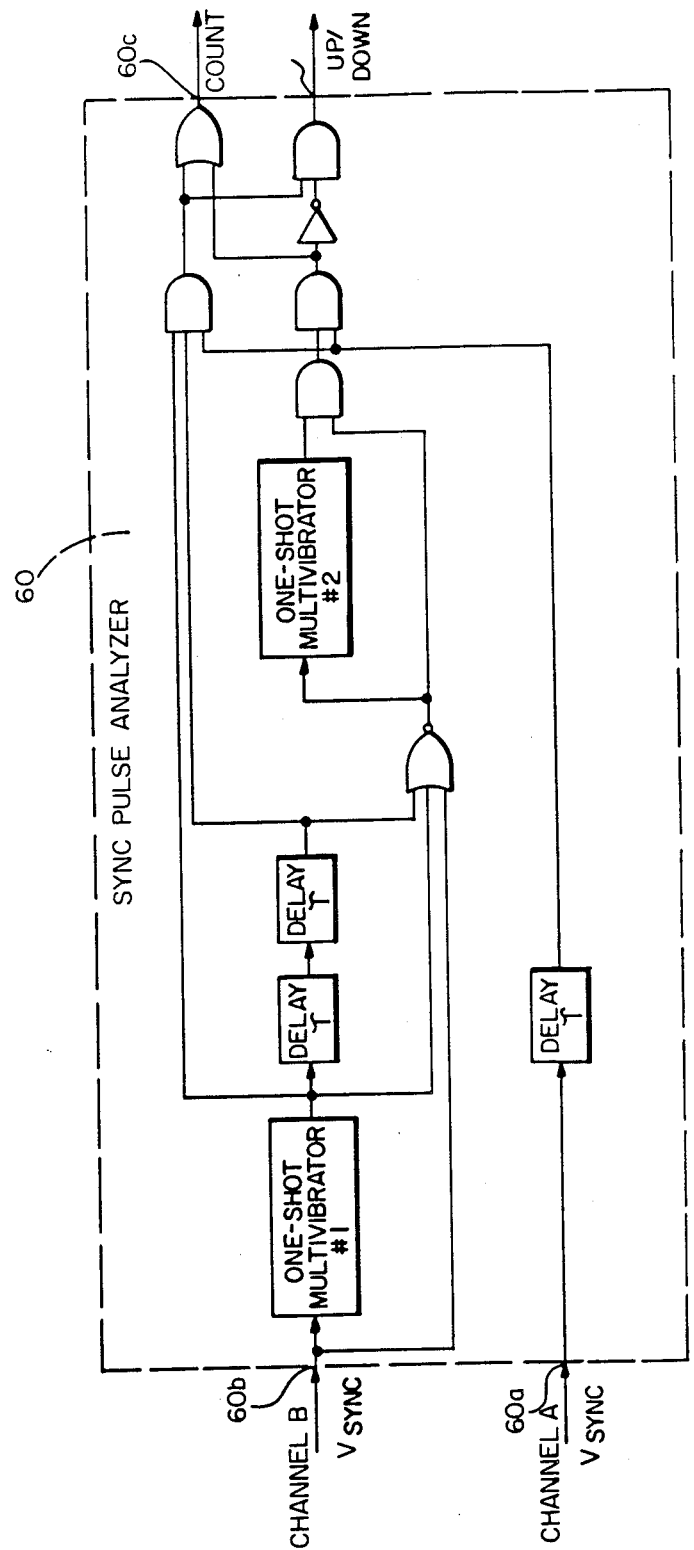
FIG. 4 is a simplified logic diagram of the sync pulse analyzer of FIG. 3.

An exemplary logic diagram of the analyzer 60 is shown in FIG. 4. Each Delay $\tau$ shown in FIG. 4 is a fraction (about $\frac{1}{8}$) of the video field scan period and is selected to limit the sensitivity of the analyzer 60 to timing differences above a suitable threshold amount. The pulse width of One Shot Multivibrators #1 and #2 in FIG. 4 is about one-half the video field scan period. The delay of One Shot #2 is the pulse width of the vertical sync pulse minus twice the pulse width of One Shot #1.

Referring to FIG. 3, the sync pulse analyzer count output 60c is applied to the count input of the up/down counter 70. The sync pulse analyzer up/down output 60d is applied to the up/down input of the up/down counter 70. The count input of the up/down counter 70 determines whether the up/down counter 70 is to change state, while the up/down input determines whether that change in state is to be plus one or minus one. The output of the up/down counter 70 is applied to the divide counter 72. Assuming the up/down counter 70 and the divide counter 72 are both 8-bit counters, all eight output bits of the up/down counter 70 are applied to all eight input bits of the divide counter 72. The counter 72 counts any pulse it receives at its clock input 72a, starting at an 8-bit number n determined by the 8-bit output of the up/down counter 70, and resets to n upon reaching its maximum count $2^8$-1 (i.e. 255). In the example of FIG. 3, the horizontal sync pulse ($H_{sync}$) of the A channel video signal is applied to the clock input of the divide counter 72. The output of the divide counter 72 is applied to the timing logic 74, which in turn generates the read enable signal each time the divide counter 72 reaches its end of count. As described previously, the read enable logic signal is applied to the memory read control input 40f of the field store memory 40.

Operation

Each time the divide counter 72 reaches the end of its count (255 for an 8-bit counter), the logic circuit 74 issues the read enable signal, permitting the next horizontal line of video data stored in the field store memory 40 to be unloaded to the digital-to-analog converter 44. The contents of the up/down counter 70 are incremented or decremented by the sync pulse analyzer 60 whenever necessary to maintain a one-half video field delay between the A channel and B channel video signals as applied to the heads 12, 14.

For example, if the A channel and B channel video signals received by the tuner 2 just happen to be exactly in time coincidence with one another, the up/down counter 70 would count up to about $2^8$-131 so that the synchronous counter 72 would count by a modulus of 131. Thus, the delay between writing the A channel video signal into the field store memory 40 and reading it out would correspond to 131 horizontal video lines, or approximately one-half of a video field, which is the desired delay. Any subsequent variations in the relative timing of the A channel and B channel video signals would cause the sync pulse analyzer 60 to change the contents of the up/down counter 70, thus changing the count modulus of the synchronous counter 72 and thereby changing the delay between the writing-in and reading-out of data in the field store memory 40. Thus, the variable delay 4 consistently maintains a one-half video field delay between the A and B channel video signals, as received by the record heads 12a, b and 14a, b.

N-Channel Recorder

This invention is useful for simultaneously recording more than two video channels simultaneously. In the preferred embodiment just described, in order to record two channels simultaneously, two pairs of heads are placed symmetrically on the rotary drum 10, the heads in each pair being displaced by a drum angle of 180°. Adjacent heads are spaced at intervals of 180°/2 and the two channels are delayed with respect to one another by ½ of a video field scan period. Generally, to record n video channels simultaneously in accordance with the invention, n pairs of heads are placed on the periphery of the rotary drum 10 at intervals of 180°/n between adjacent heads and the channels are successively delayed by (1/n)×one video field period. (Thus, the heads are in quadrature for n=2 only.) Preferably, the video tape is transported at n times standard tape speed.

Figure 5:
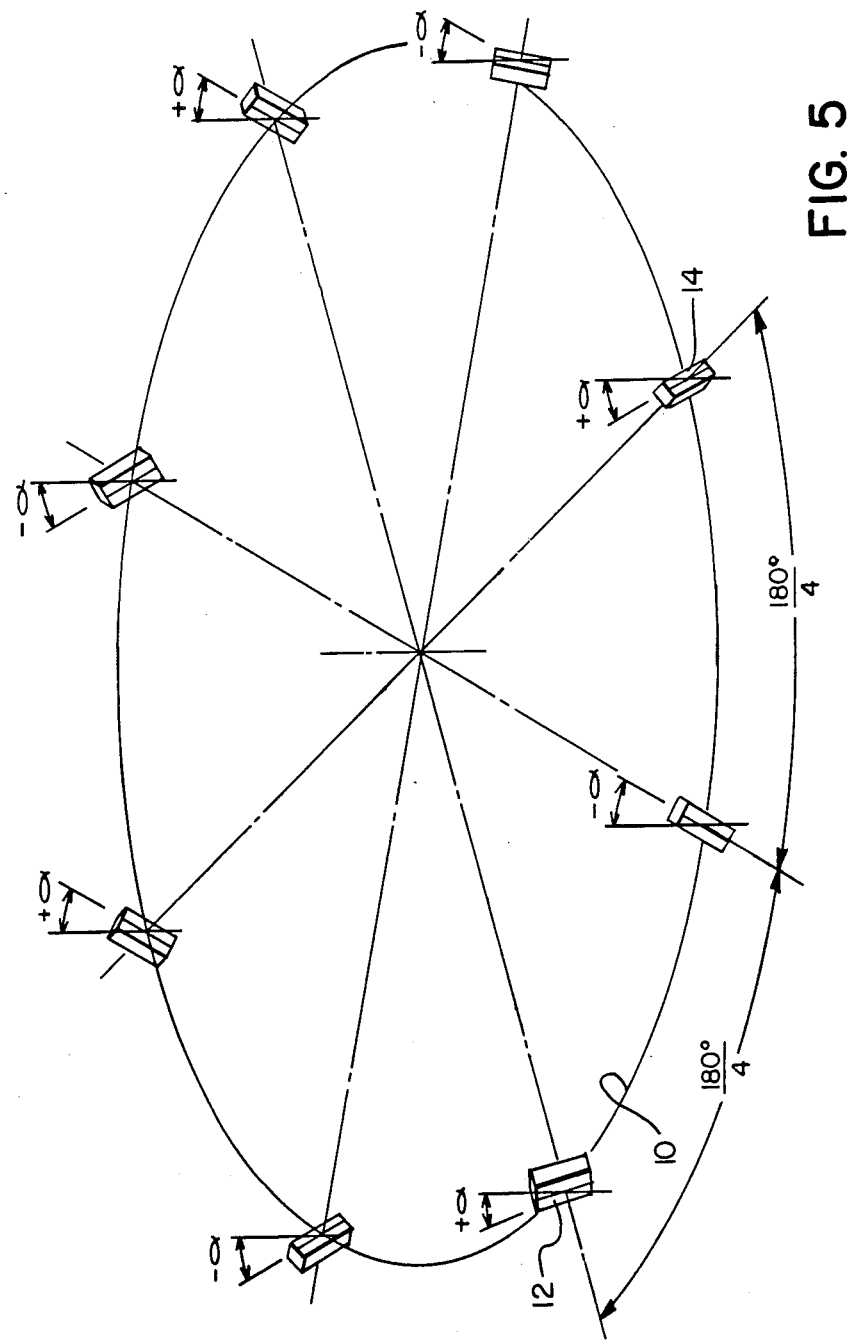
FIG. 5 is a diagram of an alternative embodiment of the invention.

FIG. 5 illustrates this concept as applied to recording four video channels simultaneously (n=4). In guardbandless recording, the head gaps of adjacent heads are canted differently in angles of azimuth $+\alpha$ and $-\alpha$, for optimum suppression of cross-talk between adjacent tracks, as shown in FIG. 5.

The invention has been described in detail with particular reference to preferred embodiments thereof, but it will be understood that variations and modifications can be effected within the spirit and scope of the invention.

What is claimed is:

1. A dual channel video tape recorder, adapted to receive two independent video channels separately, said recorder comprising:
   a rotary drum having four magnetic heads located in quadrature along its periphery;
   means for transporting a magnetic tape along said drum periphery while rotating said drum once every drum rotation period so that said heads trace adjacent tracks on said tape;
   means for coupling one of said video channels to a first two of said four heads which are located on opposite sides of said drum; and
   means for changing the timing of the other of said video channels with respect to said one video channel and for applying said other video channel to the remaining two heads on said drum, whereby successive video fields of said two channels are recorded in adjacent pairs of said tracks.

2. The video tape recorder of claim 1 further comprising means for playing back previously recorded signals, said means comprising:
   a playback processor; and
   means for connecting a selected pair of said one of the heads to said playback processor.

3. The video tape recorder of claim 1 wherein said timing changing means comprises:
   a variable delay connected between said receiving means and one pair of said heads; and
   comparator means for sensing timing differences between said video channels and for controlling said timing changing means in response to fluctuations in the timing of said video channels so as to maintain a delay interval between said video channels as applied to said magnetic heads, said delay interval corresponding to about one-fourth of said drum rotation period.

4. The video tape recorder of claim 3 further comprising a pair of vertical sync pulse separators connected to receive said two video channels and having their outputs connected separately to said comparator, whereby said comparator means senses said timing differences by sensing the outputs of said pulse separators.

5. The video tape recorder of claim 3 wherein said variable delay comprises a field store memory and means for writing-in and reading-out one of said video channels in said memory, whereby said comparator means varies the delay interval between the writing-in and the reading-out of data in said memory.

6. The recorder of claim 3 wherein each of said video channels is characterized by a video field scan period and said drum rotation period corresponds to twice said field scan period, whereby said comparator means maintains said delay interval equal to about one-half of said video field scan period.

7. The recorder of claim 1 wherein each of said magnetic heads comprises a magnetic surface characterized by an elongate gap adapted to span the width of said tape, the gaps of adjacent heads being canted differently so as to suppress playback cross-talk between said adjacent tracks.

8. A video tape recorder connectable to two video channels, said recorder comprising:
   a rotary drum and at least four recording heads located symmetrically along the periphery of said rotary drum;
   means for transporting a video tape around at least a portion of the periphery of said drum;
   means for applying a video signal from one of said two channels to two of said heads and for applying another video signal from the other of said two channels to another two of said heads simultaneously with the application of said one video signal to said first two heads;
   a variable delay connected between said applying means and one pair of said heads; and
   comparator means for sensing timing differences between said video signals and for controlling said variable delay in response to fluctuations in the timing of said video signals so as to maintain a delay interval between said video channels as applied to said magnetic heads, said delay interval corresponding to the spacing of adjacent ones of said heads on said drum.

9. The video tape recorder of claim 8 wherein said variable delay comprises a field store memory and means for writing-in and reading-out one of said video channels in said memory, whereby said comparator means varies the delay interval between the writing-in and the reading-out of data in said memory.

10. A video tape recorder adaptable to separately record a plurality of n video channels simultaneously, said n video channels characterized by a video field scan period, said recorder comprising:
    a rotary drum having a periphery;
    means for transporting a video tape around an arc portion of said drum periphery, said arc portion subtending an angle of at least $\theta$, and for rotating said drum by said angle $\theta$ once every video field scan period;
    a plural number n of pairs of heads located along the periphery of said drum, adjacent ones of said heads being spaced along said drum periphery by a drum rotation angle of about $\theta/n$;

means for applying each one of said plurality of video channels to a corresponding one of said plurality of head pairs; and means for successively delaying said plurality of video channels by delay intervals corresponding to successive integer multiples of a fraction 1/n of about one-half of said field scan period.

11. The video tape player of claim 10 wherein said tape transporting means transports said tape at a linear tape speed proportional to n, so that said recorder records tracks on said tape of a given width for different values of n.

12. The video tape recorder of claim 10 wherein said delaying means comprises means for varying the delay of different ones of said video signals in response to fluctuations in their timing so as to maintain said delay intervals constant.

13. The video tape player of claim 10 wherein said delaying means comprises a field store memory and means for writing-in and reading-out one of said video channels in said memory, and means for varying a delay interval between the writing-in and the reading-out of data in said memory.

* * * * *